March 11, 1924. 1,486,461
A. SCHEUER ET AL
APPARATUS FOR AUTOMATIC REGULATION OF BRAKING POWER ON VEHICLES
Filed Aug. 24, 1921   3 Sheets-Sheet 1
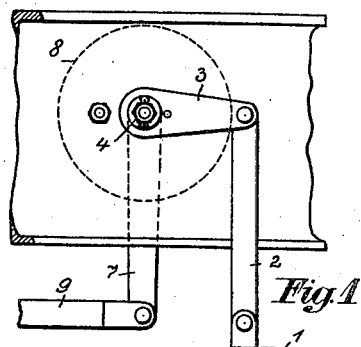
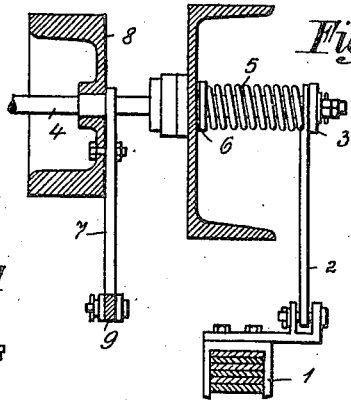
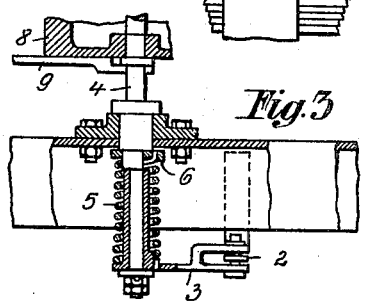
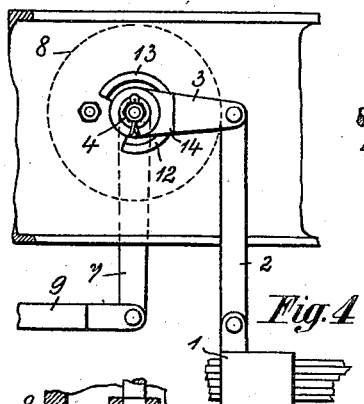
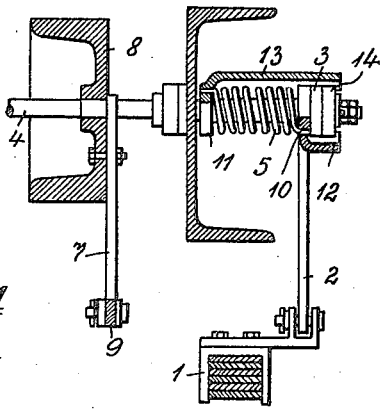
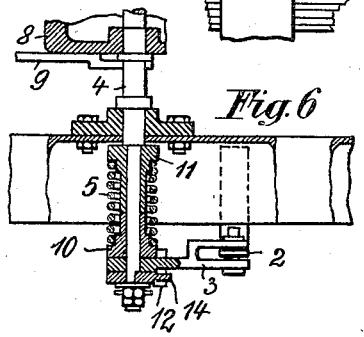

March 11, 1924.  1,486,461
A. SCHEUER ET AL
APPARATUS FOR AUTOMATIC REGULATION OF BRAKING POWER ON VEHICLES
Filed Aug. 24, 1921   3 Sheets-Sheet 3

Inventors.
Alfred & Hugo Scheuer

Patented Mar. 11, 1924.

1,486,461

UNITED STATES PATENT OFFICE.

ALFRED SCHEUER, OF VIENNA, AND HUGO SCHEUER, OF RETZ, AUSTRIA, ASSIGNORS TO HANDEL MAATSCHAPPIJ H. ALBERT DE BARY & COY, OF AMSTERDAM, NETHERLANDS, A DUTCH COMPANY.

APPARATUS FOR AUTOMATIC REGULATION OF BRAKING POWER ON VEHICLES.

Application filed August 24, 1921. Serial No. 494,838.

(GRANTED UNDER THE PROVISIONS OF THE ACT OF MARCH 3, 1921, 41 STAT. L., 1313.)

*To all whom it may concern:*

Be it known that we, ALFRED SCHEUER, railway director, a citizen of the Republic of Austria, residing at II Nordbahnstrasse 12, Vienna, Austria, and HUGO SCHEUER, engineer, a citizen of the Republic of Austria, residing at Retz, Northern Austria, have invented an Improved Apparatus for Automatic Regulation of Braking Power on Vehicles (for which I have filed applications for patents in Austria, October 7, 1920; Germany, July 10, 1920; France, August 6, 1920; Belgium, August 2, 1920; Italy, September 9, 1920; Switzerland, September 7, 1920; Spain, September 23, 1920; Great Britain, October 13, 1920; Holland, September 7, 1920; Sweden, March 25, 1921; Norway, May 31, 1921; Denmark, March 31, 1921; Czechoslovakia, March 30, 1921; Poland, March 22, 1921; Hungary, March 22, 1921; Roumania, March 30, 1921; Jugoslavia, March 30, 1921), of which the following is a specification.

The adjustment of brake apparatus for the purpose of braking fully or heavily loaded cars in the case of the continuous braking of railway trains, with a greater brake block pressure than empty or lightly loaded cars, so as to correspond with theoretical requirements, is effected at present almost always by hand. In spite of the resulting disadvantages, no definite decision has yet been taken to introduce any of the available automatic adjusting apparatus, because the latter have not yet attained the degree of reliability which is indispensable for railway working.

It has previously been proposed to provide means for adjusting the brake apparatus whereby the varying degree of sinking of the body of the car, and thereby the deflection of the vehicle supporting springs is transmitted by means of lever rodwork to a movable pivot block or fulcrum for the brake lever and displaces this fulcrum in such a manner that the braking force applied is greater with heavier loads than with lighter loads.

Even when a spring is interposed in the rodwork of such apparatus for the purpose of preventing disturbance of the braking mechanism when the brakes are applied, the jolts which are set up during the journey still remain unprovided for, with the result that the actual braking force at any instant is not dependent on the amount of loading but on the varying magnitude of the jolts which displace the movable fulcrum of the brake levers, the entire braking apparatus being thereby rendered impracticable.

The object of the present invention is to prevent this and thereby make the magnitude of the braking force as far as possible dependent only on the loading of the vehicle at the moment.

The main feature of the invention consists in causing the variations in the amount of the deflection of the supporting springs to be transmitted by means of rodwork to a spring which co-acts with a retarding or resistance means, the said spring in its turn transmitting these variations under the control of the retarding or resistance means to the brake elements, that are to be adjusted, in such a manner that it is rendered altogether incapable, or to a considerable degree incapable, of passing on jolts which are eliminated so that the brake elements are incapable of being displaced by the jolts. In all cases the spring can be replaced by one or more weights, for instance in the form of a weighted lever.

The retarding or resistance means may be constituted variously, for instance by a rotary inertia mass or fluid brake.

The invention is illustrated by way of example in the accompanying drawings in which—

Figs. 1, 2 and 3 are a side elevation, vertical cross section, and horizontal cross-section respectively of one constructional form of the apparatus.

Figs. 4, 5 and 6 are corresponding views of a modification and

Figure 7:
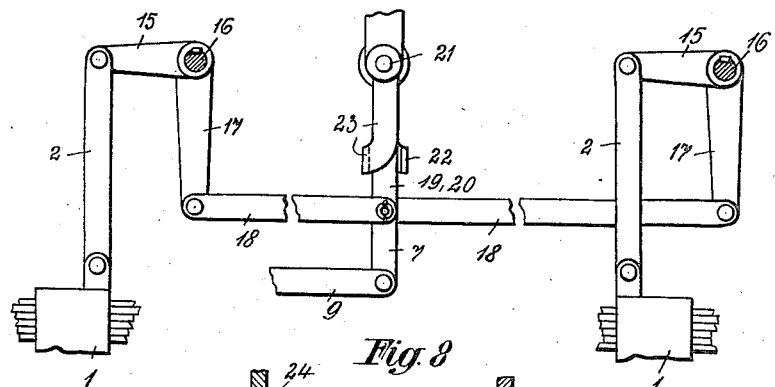
Figs. 7 and 8 are a side elevation and vertical cross-section of a further modification of the apparatus.
Figure 8:
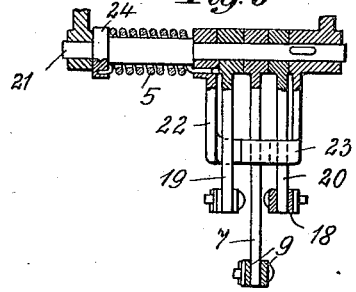
Figure 11:
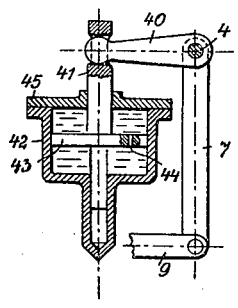
Figure 13:
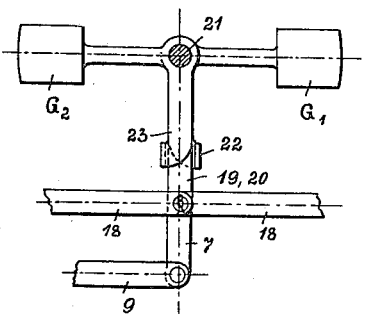
Figure 14:
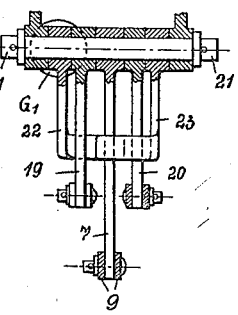
Figure 12:
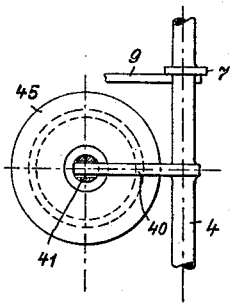
Figure 15:
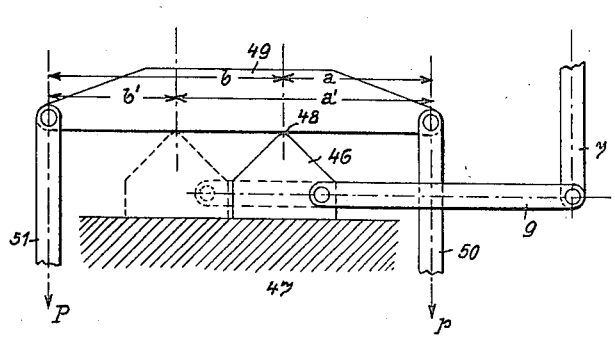

Figs. 11 and 12 are detail views, in vertical section and top plan, respectively, of a modified form of retardation means; and Figs. 13 and 14 are a side elevation and a vertical section, respectively, of a further modification somewhat similar to that shown in Figs. 7 and 8; and Fig. 15 is a fragmentary view in elevation of a portion of the braking mechanism.

The first constructional form (Figs. 1, 2 and 3) is as follows:—

To the spring buckle 1 of one of the supporting springs of the car or car bogie, there is movably jointed a connecting rod 2 which engages the crank 3 of a shaft 4. This crank is not rigidly fixed to the shaft 4, but acts upon the latter by means of the unstressed spiral spring 5, one end of which is inserted in a hole in the crank, whilst its other end is inserted in a hole in a disc 6 fixed on the shaft 4. The shaft 4 is mounted in the under frame of the car transversely of its longitudinal axis, and there are fixed to it the arm 7 and the balanced rotary mass 8. The arm 7 engages the transmitting rod 9 which leads to the brake member that is to be operated.

The manner of operation of this construction is as follows:—

When the car body rises or falls by reason of a change in the load thereon, the crank 3 will act in one or the other direction upon the spring 5. Since the latter is without stress, then, provided that this action is not too small, the shaft 4 will experience a rotation in one or the other direction corresponding to the variation in the deflection of the supporting spring, and this motion will be transmitted through the arm 7 and the transmitting rod 9 to the brake member that is to be operated. Small oscillations and jolts will be absorbed by the spring owing to its insensitiveness in its unstressed condition. Since moreover the supporting spring will always return immediately into its original position, heavier jolts will also generally be absorbed by the spring 5, because the mass 8, owing to its inertia, does not follow such quick movements. The improved apparatus has thus the effect that the brake member that is to be operated, will assume the position that corresponds to the load on the car, and will generally remain in the said position so long as the load does not alter. Should, as a result of particularly violent jolts, any alteration take place in the position of the said brake member, then the latter will immediately resume the correct position.

In the second constructional form (Figs. 4, 5 and 6) the spring 5 differs from the first constructional form in this that it has an initial stress. The said spring also does not act directly on the crank 3 and through an auxiliary disc on the shaft 4, but acts at each end upon a collar (10 and 11) freely rotatable on the shaft 4. These collars have respectively projecting impact cheeks 12 and 13 (Figs. 4 and 5) which are caused by the pressure of the spring 5 to press against both edges of the crank 3. Like the crank, there is also a short arm 14, clamped between the two impact cheeks, which arm is fixed on the shaft 4.

The operation of this apparatus is as follows:

Should the crank 3 rotate owing to an alteration in the load, then one or the other collar (10 or 11) will be directly carried around with it. The stressed spring 5 will then cause the second collar to make the same rotation, so that its impact cheeks carry the arm 14 and the shaft 4 around with them, and as a result an action is produced upon the brake member that is to be operated. The function of the mass 8 is in this case the same as in the first constructional form.

In the third constructional form (Fig. 7 and 8) instead of utilizing the deflection of a single supporting spring of the car for actuating the apparatus, as in the above described two constructional forms two or more supporting springs are included in the system.

The resistance is actuated by the rodwork which is connected up to the axle supporting spring which is not affected or is less affected than the others by the jolt, because in this construction displacement of the brake lever fulcrum only takes place when the deflections of all the supporting springs, owing to an alteration in the load, vary in the same direction.

The construction is as follows:—

On two axle-supporting spring buckles 1 on one side of the car or of the car bogie, there are pivoted operating rods 2 which are able by means of arms 15 to rotate the horizontal shafts 16 mounted in the under frame of the car. Arms 17 fixed to these shafts transmit by means of rods 18, the motion to bars 19 and 20 which are suspended from, so as to be capable of rocking on, the shaft 21 that is mounted in the under frame of the car transversely to the longitudinal axis thereof. Rotatably mounted on the same shaft are also the brake hanger 7 to which the transmitting rod 9 leading to the brake member to be operated is connected, and the driver arm 22.

The second driver arm 23 is fixed on the shaft 21. The two driver arms 22 and 23 are so constructed that they each extend at opposite sides beyond the adjacent bar 19 or 20, and beyond the brake hanger 7. The stressed spiral spring 5 is inserted with its two ends respectively into a hole in the driver arm 22, and into a hole in the collar 24 of the shaft 21 and it has for effect to cause the two driver arms 22, 23 to press against opposite edges of the hanger arm 7, and each against one of the two adjacent bars 19 and 20 respectively.

The manner of operation of this improved apparatus is as follows:—

The illustrated position is the one which corresponds to a determined load, that is to say, to a certain equal deflection of the two axle-supporting springs connected to the apparatus.

When this car is uniformly unloaded, that is to say, so that both axles are relieved of weight to the same extent, then owing to the rise of the car body, the rods 18 will move uniformly to the right, thereby imparting a large swing in the right hand direction to the bars 19 and 20 connected to them. By this means the driver arm 22 is likewise forced to the right; the driver arm 23 is pulled by the action of the spring 5 into the same inclined position, and thereby the brake hanger 7 is brought into the like inclined position. The brake member which is to be operated, will thereby alter its position to an extent corresponding to the variation in the deflection of the supporting springs.

If the car is uniformly loaded, the same set of operations will take place in the other direction.

If only one supporting spring alters its deflection, whilst the second spring does not alter its deflection, then either no further results will take place beyond the inclination of the bar 19 or 20, or if the alteration in the load take place in the opposite sense, the corresponding driver arm 22 or 23 will assume an inclined position, without this movement being followed by the second driver arm, because this is prevented by the second bar that has remained at rest. The spring 5 is stressed; the brake hanger 7 and with it the brake member which is to be operated, remain however at rest.

The same thing happens when the deflections of the two axle-supporting springs vary simultaneously in opposite directions. In such a case one bar will swing to the right and the other bar will swing to the left. The two driver arms will in any case assume the corresponding inclined positions; the brake hangers will however not be affected.

If the variation in the deflection of the supporting springs of both axles takes place simultaneously in the same direction, but to different extents, the position of the brake hanger will be altered and will correspond to the smaller variation in the deflection, because the bars 19 and 20 have unequal extents of swing; the greater swing expressing itself only by a greater stressing of the spring, whereas the bar which has the smaller swing determines the amount of change in position of the brake hanger 7.

Figure 9:
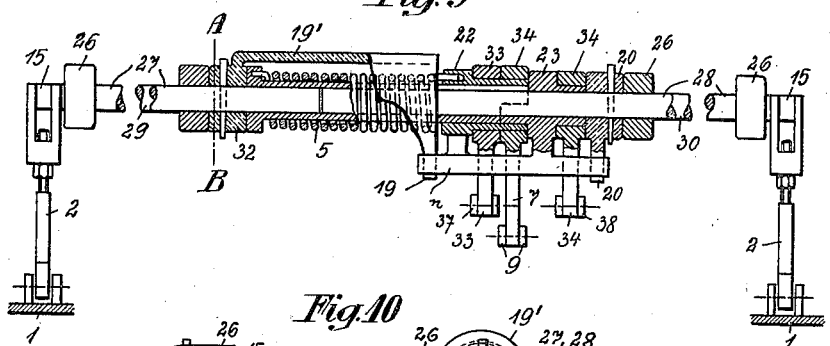
Figs. 9 and 10 are a vertical cross-section and a longitudinal section showing one mode of applying the invention when three or more axle supporting springs are included in the system.
Figure 10:
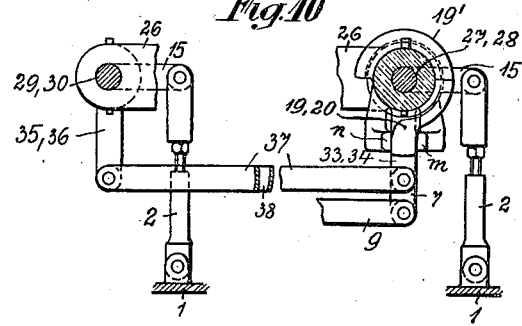

In the apparatus shown by way of example in Figs. 9 and 10, the variations in the deflection of each pair of axle supporting springs on both sides of the vehicle, that is to say four are included altogther in the system, this form of construction being also capable of use when only two or three axle supporting springs are included in the system in which, without in the least departing from the principle of the arrangement, the variations in the deflections of the axle supporting springs are transmitted to the spring 5 with the use of shafts instead of rods.

Journalled in bearings 26 on each bar of the vehicle are two pairs of axially disposed shafts, 27, 28, and 29, 30 respectively. Each of these shafts is connected by means of a crank 15 and rod 2 to a spring buckle 1, or to an axle bearing, so that these shafts will be rotated in one direction or the other when the vehicle body rises or falls. A flanged sleeve 32 is slid over the abutting ends of the two axially disposed shafts 27, 28, of one side of the vehicle, the said sleeve containing a torsion spring 5 which has an initial stress given to it. One end of this spring is inserted in a hole in the said flange on the sleeve 32, the other end being passed into a hole in the driver arm 22, which is mounted loose on the sleeve 32. A second driver arm 23 is slid over the shaft 28 and engages with the sleeve 32 in such a manner that it must partake of every rotary movement of the sleeve in one direction or the other. The two driver arms 22 and 23 are each provided with driver bars, m, n, respectively, extending in the same direction as the shafts. The drivers 19 and 20 are rigidly connected to the shafts 27 and 28, the driver 19 extending over the spring so as to form a protective housing 19' for it. On the cylindrical portions of the driver arms 22 and 23 are mounted loose drivers 33 and 34, which, when the alteration in the position of the two bars is the same, will receive from the two shafts 29 and 30 on the other bar of the vehicle through the medium of the arms 35, 36 respectively, (Fig. 10) rigidly mounted on these shafts and the rods 27, 28 respectively, an equal amount of angular deflection in the same direction as the rigid drivers 19 and 20 actuated directly by the two shafts 27 and 28. Finally the brake hanger 7, which is connected by means of the transmission rod 9 to the brake elements to be operated is mounted loosely to the cylindrical part of the driver arm 22.

The operation of the mechanism is the same in every respect as that of the constructional form shown in Figs. 7 and 8; when all four axle supporting springs are deflected by equal amounts the loose drivers 33 and 34 as well as the rigid drivers 19 and 20 will all lie in the same direction. Since the two driver bars *m* and *n* under the action of the spring 5 press against both edges of these drivers, the loose brake hanger 7 will also be held in the same position; the brake elements to be adjusted thus take up a definite position. Should the reflection of all four supporting springs be varied uniformly, that is by equal amounts in the same direction and simultaneously, such as is the case for instance with uniform loading and unloading, then all the drivers 19, 20, 33 and 34 will receive an equal amount of angular displacement in the same direction.

One of the two driver bars *m* or *n* will thereby be actuated directly, the other follows after it under the action of the spring 5 and carries the brake hanger 7 round with it. The brake hanger therefore has the same angular displacement as the drivers, and consequently the brake elements to be adjusted will alter their position corresponding to the amount of variation in the deflection of the supporting springs.

In the deflections of all the axle supporting springs do not vary but only that of one of the supporting springs, such as usually happens for instance in the case of rail jolts, then of course the driver which is connected up to the supporting spring affected will be angularly displaced and according to this displacement one or other of the driver bars *m* or *n* will thereby be actuated directly by it, the other driver bar however will be unable to follow this angular displacement because the other drivers or even only one of the other drivers remain stationary, against which the driver bar likewise rests. By this means of course it will also not be possible for the brake hanger 7 to be acted on and consequently the brake elements to be adjusted.

From the foregoing it will be understood that when the variations in the deflection of all the supporting springs included in the system are in the same direction but of unequal magnitude, the maximum amount of variation in the position of the brake hanger 7 and with it that of the brake elements to be adjusted, will correspond to that of the supporting spring, the variation in the deflection of which is least, because the driver affected, which is displaced less than the others, prevents the other driver bar from moving further.

If the deflection of all the supporting springs included in the system varies simultaneously not in the same direction but partly in one and partly in the other direction, as is the case for instance when the car body pitches, then one of the driver bars *m* or *n* will be carried round in one direction, the other in the other direction and the brake hanger 7 will be released altogether; consequently the brake hanger will not be acted upon at all in a manner which would load to an alteration in the position of the brake operating elements.

The brake members to be adjusted will therefore only be displaced when all four axle supporting springs included in the system are more or less deflected simultaneously in the same direction, which of course as a rule only happens on the load being altered not however, owing to vibrations set up during the journey.

If the deflection of the supporting springs is different from the very beginning in the case of the two axles—hitherto they have been assumed to be equal—then as will be readily understood, the position of the brake hanger 7 can itself experience no alteration if the deflections of the supporting springs become greater or smaller simultaneously, so long as neither driver arm is moved beyond the position of the brake hanger.

Since according to the foregoing, single jolts, such as are produced by rail joints, and the predominantly rocking movements of the car body in which the axle-supporting springs play in opposite directions, can exert no influence upon the position of the brake member that is to be operated, then even when only two axle-supporting springs are connected to the apparatus, and idle movements are prevented, the said member will move only seldom from its position during travelling, and then mostly only to a very small extent, since as above stated, it adjusts itself only according to the variation in the deflection of the supporting spring that is stressed the least.

It is to be understood that, in the two variations of the invention shown in Figs. 7–8 and 9–10, in which two or more axle-supporting springs are used, the retarding means consists in the rods 18, 19, 20, of Figs. 7–8, or the rods 37, 38, 33 and 34 of Figs. 9–10, which are connected up with the supporting axle-spring which is very little affected by a jolt, because, in these variations or types of the invention, an alteration of the position of the reversible part 46 (Fig. 15) of the brake takes place only when the deflection of all the supporting axle springs occurs at the same time and in the same way.

Instead of the rotary inertia mass 8, the retarding means may be constituted by a fluid brake which may for example be constructed after the manner of the well known hydraulic door closing checks and fitted in such a manner that the arm or piston rod controlled by the hydraulic brake acts on the arm 7 (Figs. 1–6).

An exemplary construction of such fluid-retardation means is shown in Figs. 11 and 12, wherein, instead of the heavy disk 8 of the device of Fig. 6, the shaft 4 (which is the same part as that bearing a similar reference-numeral in the preceding figures of the drawings) carries an arm 40 articulated with a piston-rod 41 projecting into a dash-pot or fluid-containing cylinder 42 through a cover 45 thereon, and carrying a piston 43 having a small aperture 44, whereby, as shaft 4 is turned, the piston 43 is moved up or down in the dash-pot 42 against the resistance of the fluid therein, which slowly escapes through the aperture 44 from one side of the dash-pot plunger 43 to the other side thereof. The cylinder or dash-pot 42 is adapted to be filled, preferably, with a non-freezing liquid, and is attached to the chassis of the vehicle.

The operation of the device shown in Figs. 11 and 12 is as follows: As the piston 43 can move only in accordance with the flow of the liquid through the small hole 44, from one side of the piston to the other, and as this flow can occur only very slowly on account of the smallness of the hole, therefore the piston 43 can respond only very slowly to any outside influence, or to a force tending to move the piston-rod 41 downward or upward, no matter how sudden or violent such force may be. A changing of the load on the vehicle covering a substantial period of time causes, therefore, a corresponding change in the position of the piston 43; but short jolts do not influence the position of said piston, and the jolts are taken up by the vehicle spring 5 (Figs. 1–6).

The use of a weight, instead of the spring 5 of the forms of the invention shown in Figs. 1 to 12, is exhibited in Figs. 13 and 14, which disclose an exemplary embodiment of the invention adapted more particularly for embodiment with the form of device shown in Figs. 7 and 8. In the device of Figs. 13 and 14, shaft 21 serves only as an axis, therefore the members 22, 23, as well as the rods 7, 19 and 20, are only slipped over it and can be turned. Each of the members 22, 23 is rigidly connected, as shown, with a weighted arm G', G². The weights function similarly to the spring 5 (of the device of Figs. 7 and 8), namely, to cause the members 22, 23 to engage (when both axle-supporting springs are depressed) with the two lever-arms 19, 20 and thus, also, on both sides, with the brake-hanger 7, thus also causing each member 22, 23, as a result of the torsional twist occasioned by the appropriate weight, to turn brake-hanger 7 as far around shaft 21 as the lever-arms 19, 20 will permit. In so doing, the reversible or adjustable member 46 (Fig. 15) is carried along, or actuated.

An exemplary construction or execution of the adjustable brake-member 46 is shown in Fig. 15, wherein the end of rod 9 is pivotally articulated with the bearing-piece 46, which slides on the fixed base 47. The point 48 of the brake-member 46 serves as the center of rotation for a brake-lever 49, with which the brake-rods 50, 51 connected with the brake-cylinder and the brake-shoe engage. The gearing ratio of this brake-lever is, therefore, dependent upon the position of the point 48. In the position of the member 46, as represented in full lines in Fig. 15, the gearing or transmission ratio is $\frac{a}{b}$; in the position as shown by dotted lines, it is $\frac{a'}{b'}$. The result of the latter ratio is a larger number than that of the former; therefore, the gripping power P in the braking rod 51 remaining the same, the braking power $p$ in the brake-rod 50 will be greater when the bearing-piece 46 is in the position shown in dotted lines. In this way, the amount of brake-pressure exerted on the brake-shoes can be fairly accurately adapted to the weight of the load of the vehicle.

What we claim is:

1. In a brake-device, the combination of a brake element to be actuated, a vehicle spring, a tension-element actuated by said vehicle spring, and operative connections between said tension-element and said brake-element responsive to load changes in the vehicle equipped with said brake-device, said connections including retarding means co-operating with said tension-element for preventing transmission to said brake-element of jars incident to travel of the vehicle.

2. In a brake-device, the combination of a brake-element to be actuated, a vehicle spring, a coiled spring actuated by said vehicle-spring, and operative connections between said coiled spring and said brake-element responsive to load changes in the vehicle equipped with said brake-device, said connections including retarding means co-operating with said coiled spring for preventing transmission to said brake-element of jars incident to travel of the vehicle.

3. In a brake-device, the combination of a brake-element to be actuated, a vehicle-spring, a tension element actuated by said vehicle-spring, and operative connections between said tension element and said brake-element responsive to load changes in the vehicle equipped with said brake-device, said connections including a shaft and retarding means carried thereby and co-operating with said tension element for preventing transmission to said brake-element of jars incident to travel of the vehicle.

4. In a brake device, the combination of a brake-element to be actuated, a vehicle spring, a coiled spring actuated by said vehicle-spring, and operative connections between said coiled spring and said brake-element responsive to load changes in the vehicle equipped with said brake-device, said connections including a shaft, around which said coiled spring is coiled, and retarding means carried by said shaft and co-operating with said coiled spring for preventing transmission to said brake-element of jars incident to travel of the vehicle.

5. In a brake-device, the combination of a brake-element to be actuated, a vehicle-spring, a coiled spring actuated by said vehicle-spring, and operative connections between said coiled spring and said brake-element responsive to load changes in the vehicle equipped with said brake-device, said connections including a shaft encircled by said coiled spring, and an annular body carried by said shaft and co-operating with said coiled spring for preventing transmission to said brake-element of jars incident to travel of the vehicle.

6. In a brake-device, the combination of a brake-element to be actuated, a vehicle-spring, a normally unstressed coiled spring adapted to be placed under stress by said vehicle-spring, and operative connections between said coiled spring and said brake-element responsive to load changes in the vehicle equipped with said brake-device, said connections including retarding means co-operating with said coiled spring for preventing transmission to said brake-element of jars incident to travel of the vehicle.

In testimony whereof we have hereunto set our hands this 5 day of August, 1921.

Ing. ALFRED SCHEUER.
HUGO SCHEUER.